(12) United States Patent
Albizuri Landazabal et al.

(10) Patent No.: US 9,903,587 B2
(45) Date of Patent: Feb. 27, 2018

(54) REGULATING VALVE FOR A GAS COOKING APPLIANCE

(71) Applicant: COPRECITEC, S.L., Aretxabaleta (ES)

(72) Inventors: Iñigo Albizuri Landazabal, Muxika (ES); Jose Luis Oliva Aguayo, Jalisco (MX)

(73) Assignee: COPRECI, S. COOP, Aretxbaleta (ES)

( * ) Notice: Subject to any disclaimer, the term of this patent is extended or adjusted under 35 U.S.C. 154(b) by 494 days.

(21) Appl. No.: 14/504,395

(22) Filed: Oct. 1, 2014

(65) Prior Publication Data

US 2015/0330629 A1 Nov. 19, 2015

(30) Foreign Application Priority Data

May 14, 2014 (ES) .................................. 2014 30704

(51) Int. Cl.
| | |
|---|---|
| *F16K 5/04* | (2006.01) |
| *F23N 1/00* | (2006.01) |
| *F24C 3/12* | (2006.01) |
| *F16K 5/02* | (2006.01) |
| *F16K 5/10* | (2006.01) |

(52) U.S. Cl.
CPC ............ *F23N 1/007* (2013.01); *F16K 5/0214* (2013.01); *F16K 5/0407* (2013.01); *F16K 5/103* (2013.01); *F24C 3/12* (2013.01); *F23N 2035/24* (2013.01)

(58) Field of Classification Search
CPC ................................ F23N 1/00; F23N 2035/24
USPC ........................................... 431/280; 137/881
See application file for complete search history.

(56) References Cited

U.S. PATENT DOCUMENTS

| | | |
|---|---|---|
| 2,554,470 A | 5/1951 | Mueller |
| 2,590,550 A | 3/1952 | Lamar |
| 2,987,078 A | 6/1961 | Perow |
| (Continued) | | |

FOREIGN PATENT DOCUMENTS

| | | |
|---|---|---|
| AU | 4133372 A | 10/1973 |
| EP | 2708816 A1 | 3/2014 |
| (Continued) | | |

OTHER PUBLICATIONS

Spanish Office Action and Written Opinion with English Translation dated Dec. 21, 2015 in corresponding Spanish Application No. 201430704.

(Continued)

*Primary Examiner* — Avinash Savani
(74) *Attorney, Agent, or Firm* — Edell, Shapiro & Finnan, LLC

(57) ABSTRACT

Regulating valve for a gas cooking appliance suitable for supplying different types of combustible gas such as, for example, natural gas or liquefied gas. A valve body of the valve has an inlet conduit, an outlet conduit and a cavity wherein a rotary regulating member is housed. The regulating member includes a plurality of inlet paths communicated with the inlet conduit which, by means of the rotation of the regulating member, allows varying gas flow in the outlet conduit. According to some implementations, the inlet path of the regulating member corresponding to a minimum gas flow is in one and the same angular and axial position for each of the different types of combustible gases.

28 Claims, 9 Drawing Sheets

(56) References Cited

U.S. PATENT DOCUMENTS

| | | | |
|---|---|---|---|
| 3,001,547 A * | 9/1961 | Brumbaugh | F16K 5/10 137/614.17 |
| 4,020,870 A | 5/1977 | Carlson | |
| 5,009,393 A | 4/1991 | Massey | |
| 7,096,887 B2 * | 8/2006 | Tupa | F16K 11/083 137/625.47 |
| 7,942,164 B2 * | 5/2011 | Hsiao | F23N 1/007 137/625.47 |
| 7,967,005 B2 * | 6/2011 | Parrish | A47J 37/0713 126/39 N |
| 8,061,347 B2 | 11/2011 | Manning | |
| 9,200,807 B2 * | 12/2015 | Albizuri | F23N 1/007 |
| 9,410,701 B1 * | 8/2016 | Li | F23N 1/007 |
| 2003/0010952 A1 | 1/2003 | Morete | |
| 2005/0202361 A1 * | 9/2005 | Albizuri | F24C 3/124 431/354 |
| 2006/0175566 A1 * | 8/2006 | Albizuri | F16K 5/0214 251/207 |
| 2011/0143294 A1 * | 6/2011 | Deng | F23D 17/002 431/279 |
| 2013/0260327 A1 * | 10/2013 | Oliva Aguayo | F23N 1/007 431/280 |
| 2014/0151591 A1 * | 6/2014 | Gerenabarrena Meabebasterretxea | F16K 35/027 251/227 |

FOREIGN PATENT DOCUMENTS

| | | | |
|---|---|---|---|
| ES | 302789 A3 | 2/1965 | |
| ES | 1076830 U | 4/2012 | |
| GB | 1099630 A * | 1/1968 | F16K 5/0214 |
| GB | 2015702 A | 9/1979 | |
| GB | 1099630 A | 11/2014 | |
| WO | 2014190144 A1 | 11/2014 | |
| WO | WO 2014190144 A1 * | 11/2014 | F16K 5/0207 |

OTHER PUBLICATIONS

European Search Report dated Sep. 21, 2015 in corresponding European Application No. 15382177.2-1605.

* cited by examiner

REGULATING VALVE FOR A GAS COOKING APPLIANCE

CROSS-REFERENCE TO RELATED APPLICATIONS

This application relates to and claims the benefit and priority to Spanish Patent Application No. P201430704, filed May 14, 2014.

TECHNICAL FIELD

The present invention relates to gas valves suitable for regulating the flow of at least two types of gas.

BACKGROUND

Gas valves for home cooking appliances using a single valve for regulating the flow of two different families of gas such as natural gas NG and/or liquefied petroleum gas LPG are known.

U.S. Publication No. 2006/0175566 A1 discloses a gas valve for a home cooking appliance which can be supplied by different types of combustible gas, such as, for example, natural gas (NG) or liquefied gas (LPG). The valve includes a valve body having an inlet conduit and an outlet conduit, and a rotary regulating member housed in the valve body. The regulating member has a first opening corresponding to a maximum flow $Q_{Max}$, a second opening corresponding to an intermediate flow $Q_{int}$, and two successive openings corresponding to a minimum flow $Q_{Min}$ spaced apart from one another in the rotational direction. According to one implementation one of the two successive openings is for NG and the other is for LPG. In the minimum flow position, the regulating member is positioned with the inlet opening of minimum flow $Q_{Min}$ corresponding to the type of gas to be used aligned with the inlet conduit. Depending on whether or not a stop element is included, one or the other inlet opening of minimum flow $Q_{Min}$ in the regulating member is aligned with the inlet conduit in the position of minimum flow.

U.S. Publication No. 2013/0260327A1 discloses a gas valve for a home cooking appliance which can be supplied by different types of combustible gas, such as, for example, NG or LPG. The valve comprises a valve body comprising an inlet conduit and an outlet conduit, and a rotary regulating member housed in the valve body. The regulating member comprises a first opening corresponding to a maximum flow $Q_{Max}$, a second opening corresponding to an intermediate flow $Q_{int}$, and a third opening corresponding to a minimum flow $Q_{Min}$. In use with NG and LPG the inlet opening(s) of the regulating member corresponding to NG is located in a first axial position, and the inlet opening(s) corresponding to LPG is located in a second axial position, the gas valve comprising a regulating element which allows axially aligning the inlet openings of the regulating member of NG or LPG with the inlet conduit.

SUMMARY OF THE DISCLOSURE

According to some implementations a regulating valve for a gas cooking appliance suitable for supplying at least two types of combustible gas, such as, for example, NG or LPG is provided and that comprises a valve body with an inlet conduit, an outlet conduit, and a rotary regulating member housed in the valve body, the regulating member comprising a plurality of inlet paths communicated with the inlet conduit which allows varying gas flow Q at an outlet of the valve by means of the rotation of the regulating member.

Among the inlet paths of the regulating member which are communicated with the inlet conduit of the valve body, the inlet path of the regulating member corresponding to a minimum flow "$Q_{Min}$" is in one and the same angular and axial position for a first type of gas (e.g. NG) and a second type of gas (e.g. LPG). Throughout the remainder of the present disclosure reference will be made to a regulating valve suitable for delivering both NG and LPG. It is appreciated, however, that the disclosure is not limited to regulating the flow of NG and LPG types of gases, but is instead applicable to regulating any of a variety of different types of gases.

As a result of the inlet path of the regulating member corresponding to a minimum flow $Q_{Min}$ being arranged in one and the same angular position, it is not necessary to add, replace or remove any stop element in order for the regulating member to be correctly aligned in an angular manner with the inlet conduit, regardless of the type of gas used. In addition, since the inlet path of the regulating member corresponding to a minimum flow $Q_{Min}$ is arranged in one and the same axial position, no regulating element is necessary in order for the regulating member to be correctly aligned in an axial manner with the inlet conduit, according to the type of gas used.

These and other advantages and features will become evident in view of the drawings and the detailed description of the invention.

BRIEF DESCRIPTION OF THE DRAWINGS

FIG. 5a shows an elevation view of the regulating member of the regulating valve of FIG. 1, showing a first opening corresponding to maximum flow, and a second groove-shaped opening corresponding to an intermediate flow.

FIG. 5b shows an elevation view of the regulating member of FIG. 5a that has been rotated, showing a slot corresponding to minimum flow.

FIG. 5c shows a section view of the regulating member of FIG. 5a according to line Vc-Vc.

FIG. 6b shows an elevation view of the injector of FIG. 6a.

FIG. 6c shows a perspective view of the injector of FIG. 6a.

DETAILED DESCRIPTION

Figure 1:
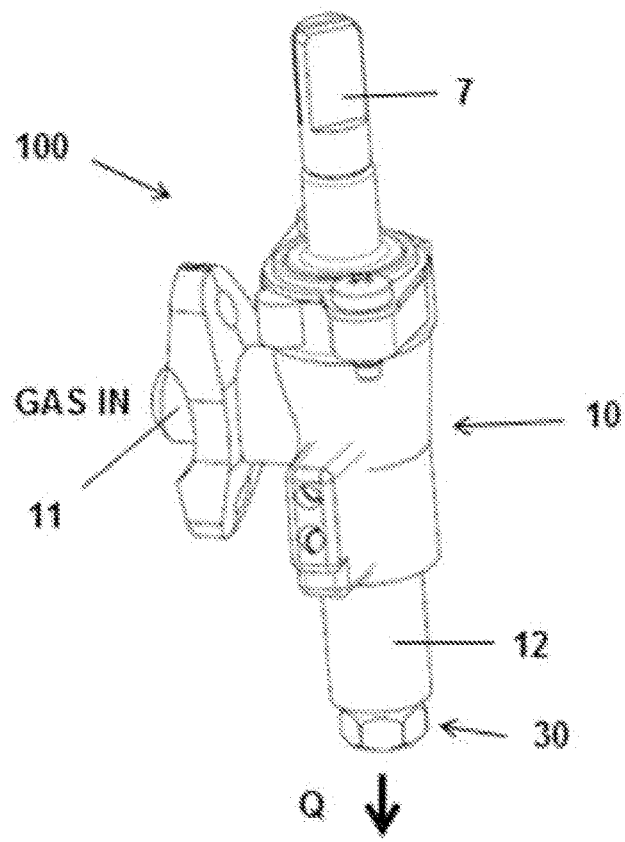
FIG. 1 shows a perspective view of a regulating valve for a gas cooking appliance according to one implementation.
Figure 2:
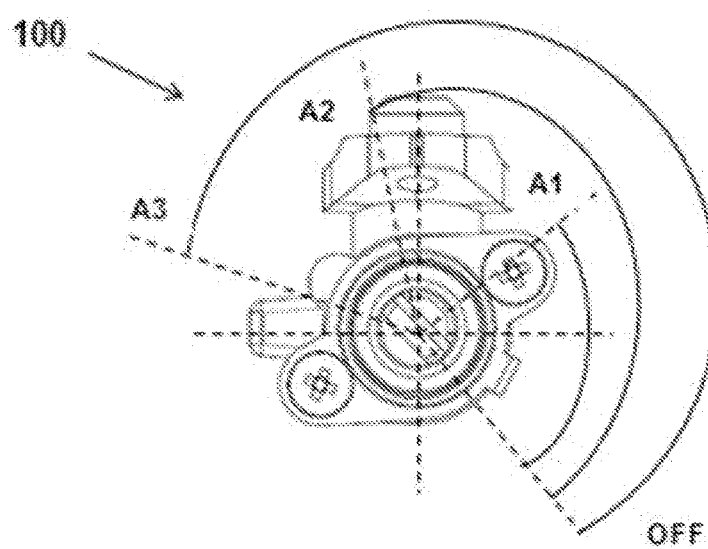
FIG. 2 shows a plan view of the regulating valve of FIG. 1, indicating the different angular positions of the rotating shaft of the regulating valve.
Figure 3A:
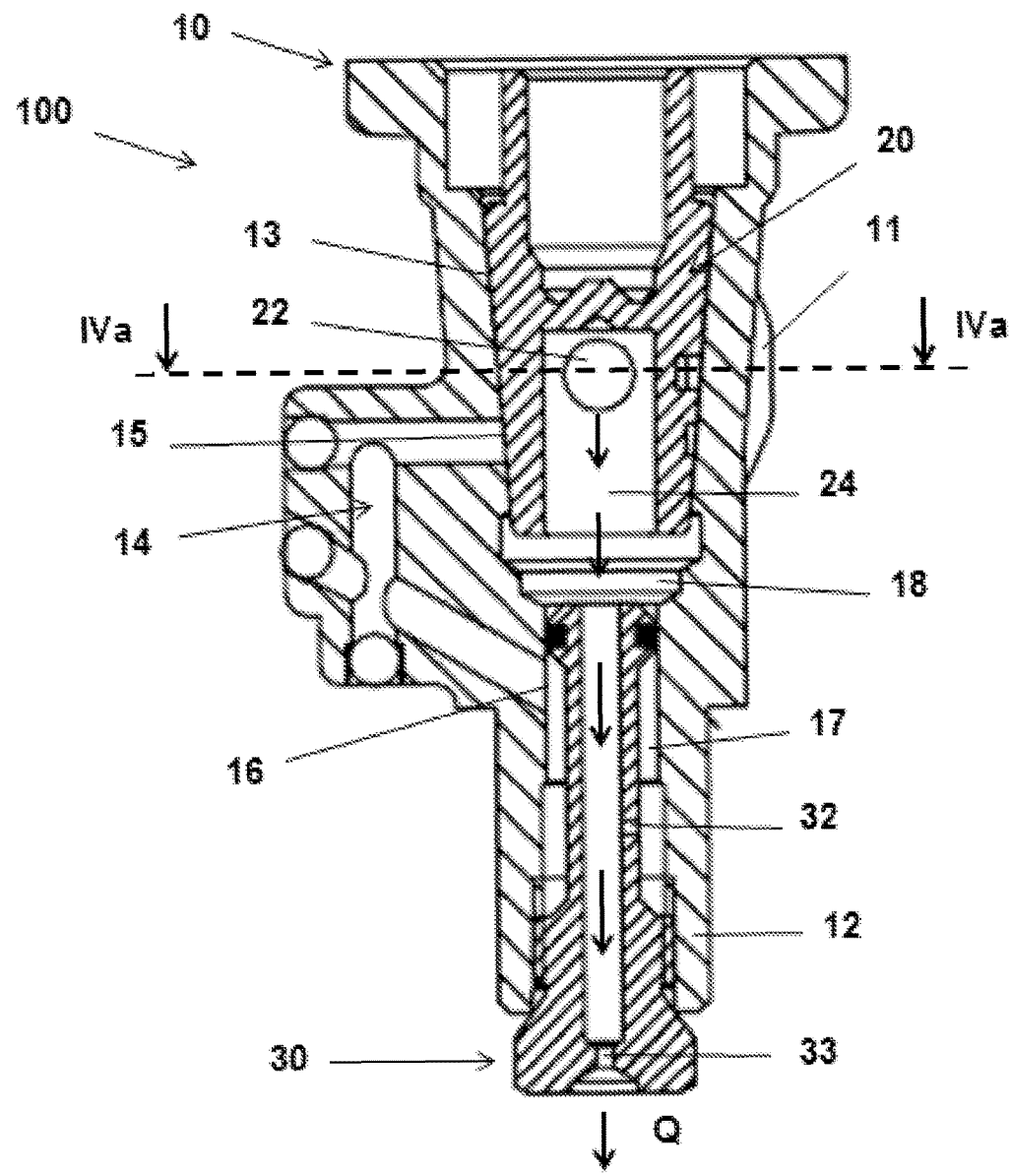
FIG. 3a shows a longitudinal section view of the regulating valve of FIG. 1, the regulating member being regulated in an angular position corresponding to a maximum flow.
Figure 3B:
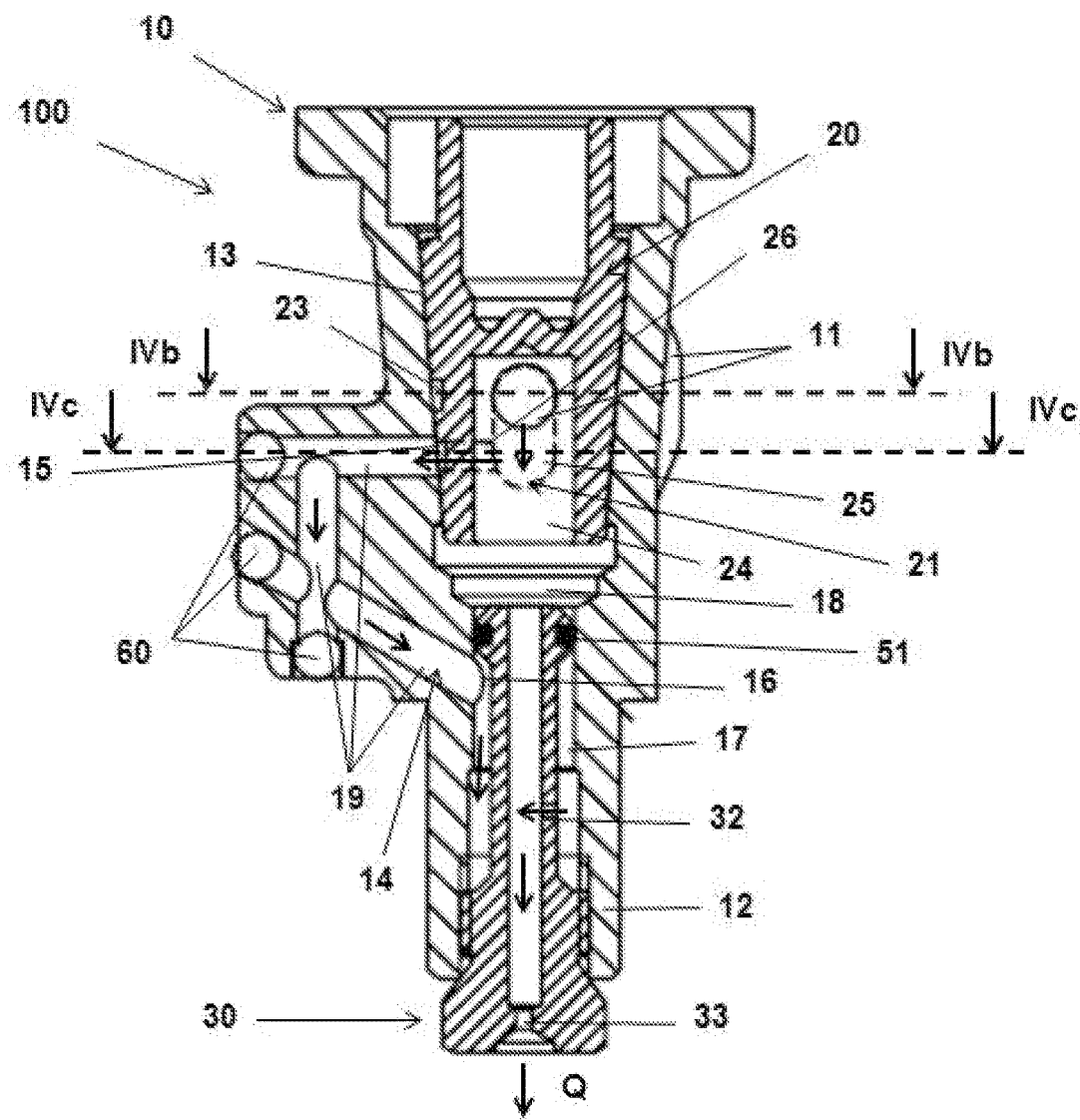
FIG. 3b shows a longitudinal section view of the regulating valve of FIG. 1, the regulating member being regulated in an angular position corresponding to a minimum flow.

FIG. 1 shows a perspective view of a regulating valve 100 for a gas cooking appliance according to one implementation, suitable for supplying different types of combustible gas, such as, for example NG or LPG. FIG. 2 shows a plan view of the regulating valve of FIG. 1, indicating the different angular positions of a rotating shaft 7 of the valve 100. The regulating valve 100 includes a valve body 10 comprising a gas inlet conduit 11 and a gas outlet conduit 12. According to some implementations one or both of the inlet and outlet conduits is cylindrical or substantially cylindrical. A rotary regulating member 20 positioned between the gas inlet and outlet conduits is adapted to regulate the flow of gas through the regulating valve 100. The regulating valve 100 also includes an injector 30 arranged in the outlet conduit 12 of the valve body 10. FIGS. 3a and 3b show a longitudinal section view of the regulating valve 100, with the regulating member 20 and the injector 30 mounted in the valve body 10, FIG. 3a showing the regulating member 20 regulated in an angular position corresponding to a maximum flow $Q_{Max}$, and FIG. 3b showing the regulating member 20 regulated in an angular position corresponding to a minimum flow $Q_{Min}$. As will be discussed in more detail below, the injector 30 is interchangeable, there being provided a first injector for assisting in the regulation of NG and a second injector for assisting in the regulation of LPG.

The valve body 10 includes a cavity 13 suitable for receiving the rotary regulating member 20. According to some implementations the cavity 13 has a substantially frustoconical shape. The regulating member 20 comprises a plurality of inlet paths which are communicated with the inlet conduit 11 of the valve body 10 depending on the angular orientation of the regulating member 20. The rotating shaft 7 is attached to the regulating member 20 (not shown in the drawings), and when rotated causes the regulating member to also rotate to vary the gas flow Q at the valve outlet.

The inlet paths of the regulating member 20, which are arranged on its side surface, include a first opening 22 corresponding to the angular position of maximum flow $Q_{Max}$, a second opening 23 corresponding to the angular position of intermediate flow, and a slot 21 arranged on the outer side surface of the regulating member 20, corresponding to the angular position of minimum flow $Q_{Min}$. The first opening 22, the second opening 23, and the slot 21 correspond with different angular positions A1, A1-A2, A3 of the regulating member 20, respectively, from an initial position OFF in which no gas enters the gas regulating valve 100 from the inlet conduit 11. The angular position of the first opening 22, second opening 23, and the slot 21 is the same for NG and LPG.

Figure 4A:
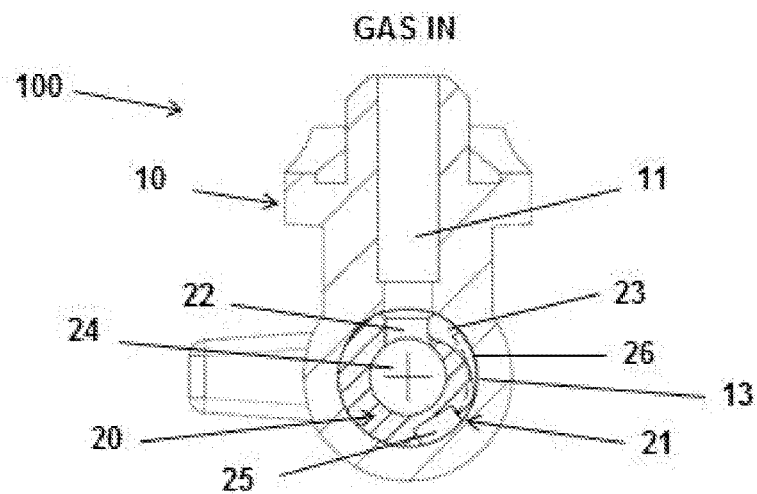
FIG. 4a shows a cross-section view of the regulating valve of FIG. 3a according to line IVa-IVa.
Figure 4B:
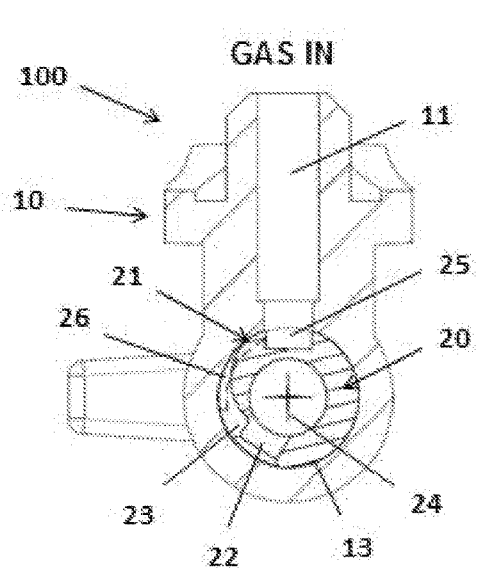
FIG. 4b shows a cross-section view of the regulating valve of FIG. 3b according to line IVb-IVb.
Figure 4C:
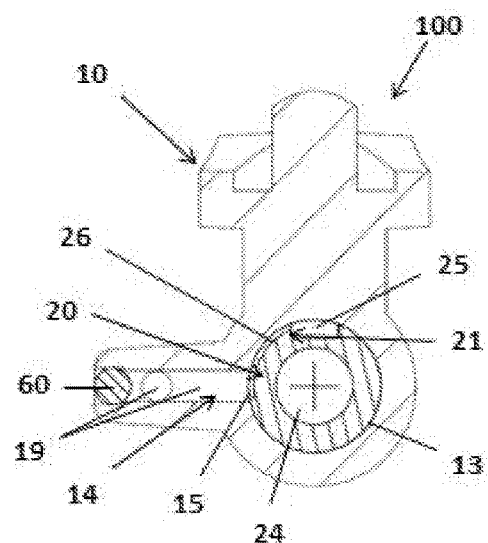
FIG. 4c shows a cross-section view of the regulating valve of FIG. 3b according to line IVc-IVc.

FIG. 4a shows a cross-section view of the regulating valve of FIG. 3a according to line IVa-IVa, FIG. 4b shows a cross-section view of the regulating valve of FIG. 3b according to line IVb-IVb, and FIG. 4c shows a cross-section view of the regulating valve of FIG. 3b according to line IVc-IVc. FIG. 5a shows an elevation view of the regulating member 20 of the regulating valve 100 of FIG. 1, showing the first opening 22 corresponding to maximum flow $Q_{Max}$, and the second groove-shaped opening 23 corresponding to intermediate flow $Q_{int}$. FIG. 5b shows an elevation view of the regulating member 20 of FIG. 5a that has been rotated, showing the slot 21 corresponding to minimum flow $Q_{Min}$, and FIG. 5c shows a section view of the regulating member 20 of FIG. 5a according to line Vc-Vc. As can be seen in the drawings, the slot 21, which is the inlet conduit of the regulating member 20 corresponding to minimum flow $Q_{Min}$, is in one and the same angular and axial position for NG and LPG.

The regulating member 20 internally comprises an axial inner chamber 24, the inner chamber 24 being communicated with the first opening 22 traversing the wall of the regulating member 20. The second opening 23 also traverses the wall of the regulating member 20 and is also in fluid communication with the inner chamber 24. The inner chamber 24 of the regulating member 20 is in fluid communication with the outlet conduit 12 of the valve body 10. According to some implementations the second opening 23 is groove-shaped and is oriented substantially perpendicular to the longitudinal axis of the regulating member 20. The second opening 23 has a length that partially circumscribes the regulating member 20, the second opening 23 having a shape with decreasing section along its length such that the corresponding intermediate flow $Q_{int}$ decreases as rotation of the regulating member 20 progresses between angular position A1 and A2. The second opening 23 is in communication at one end with the first opening 22. According to some implementations the second opening 23 comprises a longitudinal axis that is maintained in substantially the same axial position as the regulating member 20 is rotated between angular positions A1 and A2. According to some implementations the longitudinal axis of the second opening 23 is aligned with the center of the first opening 22. Therefore, when the regulating member 20 is rotated and arranged in the angular position A1 corresponding to maximum flow $Q_{Max}$, or in the angular position A1-A2 corresponding to intermediate flow $Q_{int}$, the incoming gas flow is driven from the inlet conduit 11 to the outlet conduit 12, as shown by the arrows in FIG. 3a.

To drive the gas flow from the inlet conduit 11 to the outlet conduit 12 when the regulating member 20 is arranged in the angular position A3 corresponding to minimum flow $Q_{Min}$, the valve body 10 internally comprises an inner conduit 14 communicating the inlet conduit 11 with the outlet conduit 12. When the regulating member 20 is arranged in the angular position A3, the inlet conduit 11 coincides with the slot 21, as shown in FIG. 4b. The inner conduit 14 of the valve body 10 has at one end a first opening 15 which is arranged on the inner surface of the cavity 13 of the valve body 10. The inner conduit 14 has at its other end a second opening 16 which is arranged on the inner surface of the outlet conduit 12 of the valve body 10. Therefore, in the angular position A3 of the regulating member 20 corresponding to minimum flow $Q_{Min}$, the gas flow can be driven from the inlet conduit 11 to the outlet conduit 12 first through slot 21 and then through inner conduit 14, as shown by the arrows in FIG. 3b. Therefore, rotating the regulating member 20 by means of the rotating shaft 7 allows progressively placing the inlet conduit 11 in communication with the first opening 22, the second opening 23 and the slot 21, which thus allows varying the gas flow supplied to the valve body 10 of the regulating valve 100.

Figure 6A:
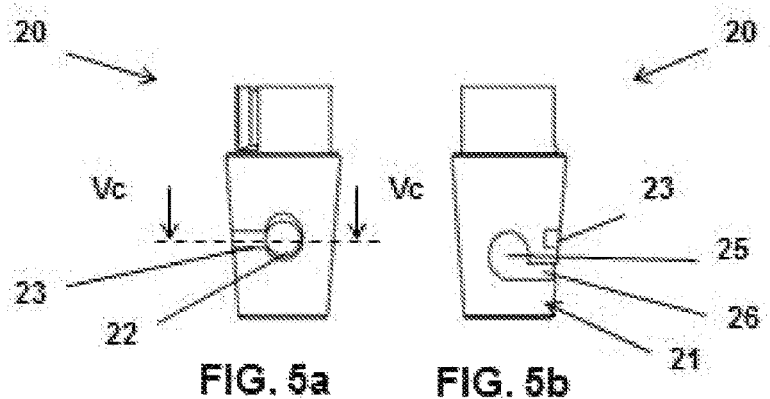
FIG. 6a shows a longitudinal section view of an injector of a regulating valve with a first calibrated opening corresponding to minimum flow arranged in the injector.
Figure 6B:
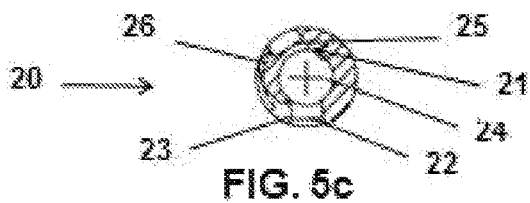
Figure 6C:
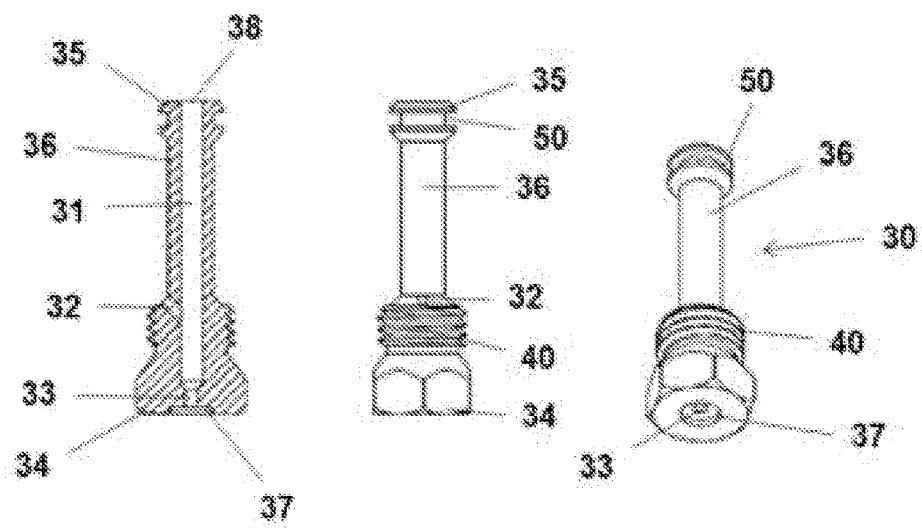

FIGS. 6a, 6b, and 6c show a longitudinal section view, an elevation view, and a perspective view of the injector 30 of the regulating valve 100 depicted in FIGS. 3a and 3b. According to some implementations the injector 30 has a substantially cylindrical shape and comprises a first end 34 forming a base and a second end 35 opposite the first end 34. The injector 30 has a threaded area 40 arranged near the first end 34, a central body 36 arranged between the threaded area 40 and the second end 35, and a circular groove 50 located close to the second end 35. According to some implementations the groove runs perimetrically around the central body 36.

The threaded area 40 of the injector 30 allows attaching the injector 30 to the outlet conduit 12 of the valve body 10, such that the gas flow cannot go through the threaded attachment. The central body 36 of the injector 30 has an outer diameter smaller than the inner diameter of the outlet conduit 12, such that an intermediate chamber 17 is formed between the outer wall of the central body 36 and the inner wall of the outlet conduit 12. According to some implementations an elastomeric gasket 51 is positioned in the circular groove 50 and fitted between the central body 36 of the injector 30 and the inner wall of the outlet conduit 12 to prevent gas flow through the fitting area. The intermediate chamber 17 arranged between the outlet conduit 12 and the central body 36 of the injector 30 is thus insulated between the threaded area 40 and the gasket 51.

The injector 30 has an inner conduit 31 running longitudinally between the first end 34 and the second end 35. The inner conduit 31 communicates at the first end 34, with the outside of the regulating valve 100 through a first opening 37. According to some implementations the inner conduit 31 communicates with the outlet conduit 12 of the valve body 10 through a first calibrated opening 32, the outlet of the first calibrated opening 32 into the outlet conduit 12 being arranged in the intermediate chamber 17. The second opening 16 of the inner conduit 14 of the valve body 10 is arranged in the inner wall of the outlet conduit 12 corresponding to the area where the intermediate chamber 17 is located. According to one implementation the first calibrated opening 32 has a first cross-sectional area/diameter that allows defining the minimum flow $Q_{Min}$ for NG. According to another implementations the first calibrated opening 32 has a second cross-sectional area/diameter less than the first cross-sectional area/diameter that allows defining the minimum flow $Q_{Min}$ for LPG.

The first calibrated opening 32 may be arranged anywhere in the inner conduit 31 of the injector 30 between the threaded area 40 and the second end 35 of the injector 30. In the injector 30 shown in FIGS. 6a, 6b, and 6c, the first calibrated opening 32 is arranged nearer the base of the injector 30 close to the threaded area 40. The first calibrated opening 32 being located nearer the base of the injector advantageously places it in an area of a higher pressure due to the gas flow, and benefits the operation of the gas regulating valve 100 when it is located in the position of minimum flow. According to other implementations, as shown in FIGS. 3a and 3b, the first calibrated opening 32 is arranged in the inner conduit 31 about halfway between the first end 34 and the second end 35 of the injector 30.

The regulating member 20 is arranged in the valve body 10 before the outlet conduit 12, according to the direction of gas flow. The valve body 10 comprises an outlet chamber 18 communicating the outlet of the inner chamber 24 of the regulating member 20 with the outlet conduit 12. According to some implementations the second end 35 of the injector 30 is arranged at the beginning of the outlet conduit 12, according to the gas flow. The gasket 51 arranged in the circular groove 50 of the injector 30 therefore fits with the inner wall of the outlet conduit 12 at the beginning thereof.

When the rotating shaft 7 is rotated and the regulating member 20 is arranged in angular position A1 or angular position A1-A2, therefore corresponding to the position of maximum flow $Q_{Max}$ or to the position of intermediate flow $Q_{int}$, respectively, the inlet conduit 11 of the valve body 10 coincides with the first opening 22 or the second opening 23, and the gas flows through the openings, circulates through the inner chamber 24 of the regulating member 20, and continues through the outlet chamber 18 to the outlet conduit 12, as shown by the arrows in FIG. 3a. Since the gasket 51 seals the passage between the inner wall of the outlet conduit 12 and the outer wall of the central body 36 of the injector 30, the gas at the outlet of the outlet chamber 18 is introduced in the inner conduit 31 of the injector 30 through a second opening 38 of the injector 30. Finally, the gas exits the regulating valve 100 through the first opening 37 of the injector 30. According to some implementations a second calibrated opening 33 is provided in the injector 30 upstream the first opening 37, the second calibrated opening 33 being arranged near the first end 34 of the injector 30 and calibrated to define a maximum flow rate $Q_{max}$ at the outlet of the valve 100. According to some implementations the first opening 37 of the injector 30 itself is calibrated for establishing a maximum flow rate $Q_{max}$ at the outlet of the valve 100 without there being a need for the second calibrated opening 33.

According to the just previously described gas flow, under certain circumstances the gas may pass through the first calibrated opening 32, intermediate chamber 17, second opening 16, inner conduit 14 and opening 15 toward the regulating member 20, but is prevented from passing through the regulating member 20 as the slot 21 does not coincide with the first opening 15 in angular positions A1, A1-A2.

According to some implementations the slot 21 of the regulating member 20 comprises a cavity 25 and a groove 26. The cavity 25 may be substantially circular, such that when the regulating member 20 is arranged in the angular position A3 corresponding to minimum flow $Q_{Min}$, the cavity 25 coincides with the inlet conduit 11. The cavity 25 is preferably, but not necessarily circular, and can also be concentric circular according to how far into the wall of the regulating member 20 it goes. According to some implementations the groove 26 is arranged substantially perpendicular to the longitudinal axis of the regulating member 20, and is communicated at one end to the cavity 25. Therefore, by arranging the regulating member 20 in the angular position A3 corresponding to minimum flow $Q_{Min}$, the cavity 25 communicates with the inlet conduit 11, and since the cavity 25 is communicated with the groove 26, the gas flows through the groove 26 which coincides at one end with the first opening 15 of the inner conduit 14, until reaching the first opening 15. This construction of the slot 21 with a cavity 25 and a groove 26 allows greater flexibility in the construction of the regulating member 20, being able to generate different configurations that allow matching up the inlet conduit 11 of the valve body 10, the cavity 25 and the groove 26 of the slot 21, and the first opening 15 of the inner conduit 14 of the valve body 10.

Therefore, when the rotating shaft 7 is rotated and the regulating member 20 is arranged in the angular position A3 corresponding to the position of minimum flow $Q_{Min}$, the inlet conduit 11 of the valve body 10 coincides with the cavity 25 of the slot 21, and the gas flows through the cavity 25, through the groove 26, and is introduced through the first opening 15 of the inner conduit 14 of the valve body 10. The gas circulates through the inner conduit 14 to the second opening 16 of the inner conduit 14. The gas exits into the intermediate chamber 17 through the second opening 16 of the inner conduit 14. The intermediate chamber 17 is insulated both by means of the fitting made between the injector 30 and the outlet conduit 12 with the gasket 51, and with the threaded area 40. According to some implementations the gas therefore continues through the intermediate chamber 17 to the first calibrated opening 32 of the injector 30, and is introduced in the inner conduit 31 of the injector 30. The gas finally exits the regulating valve 100 through the first opening 37 as shown by the arrows in FIG. 3b. As previously discussed, according to some implementations gas flows through a second calibrated opening 33 of the injector 30 before passing through the first opening 37. Although the gas has the possibility of exiting through the second opening 38 of the injector 30 to the outlet chamber 18 of the valve body 10, and from the outlet chamber 18 through the intermediate chamber 24 of the regulating member 20, the gas can flow to the first opening 22 and the second opening 23 of the regulating member 20, but it cannot go beyond this position because the first opening 22 and the second opening 23 do not coincide with the inlet conduit 11 in angular position A3.

According to some implementations, the injector 30 corresponding to NG has a second calibrated opening 33, defining the maximum flow $Q_{Max}$, with a diameter greater than the diameter of the first calibrated opening 32 of the injector 30, and the injector 30 corresponding to LPG has a second calibrated opening 33 with a diameter greater than the diameter of the first calibrated opening 32 of the injector 30. Therefore, when the regulating member 20 is arranged in the angular position A3, therefore corresponding to the position of minimum flow $Q_{Min}$, the gas flow is defined by the first calibrated opening 32, and when this gas flow subsequently goes through the second calibrated opening 33, since the diameter of the second calibrated opening 33 is greater than the diameter of the first calibrated opening 32 of the injector 30, the gas flow is not limited by the second calibrated opening 33.

In the foregoing disclosure, two types of injectors 30 have been described. According to a first type of injector 30 configured for the delivery of NG, the injector comprises a first calibrated hole 32 and in some instances a second calibrated hole 33. The first calibrated hole 32 being calibrated to establish at the outlet of the valve 100 a minimum gas flow $Q_{min}$ for NG, and the second calibrated hole 33 being calibrated to establish at the outlet of the valve 100 a maximum gas flow $Q_{max}$ for NG. According to a second type of injector 30 configured for the delivery of LPG, the injector also comprises a first calibrated hole 32 and in some instances a second calibrated hole 33. The first calibrated hole 32 being calibrated to establish at the outlet of the valve 100 a minimum gas flow $Q_{min}$ for LPG, and the second calibrated hole 33 being calibrated to establish at the outlet of the valve 100 a maximum gas flow $Q_{max}$ for LPG. According to other implementations the slot 21 of the regulating member 20 is configured to provide a calibrated minimum gas flow $Q_{min}$ for NG. That is, the dimensional characteristics of the cavity 25 and/or groove 26 of slot 21 are such that when the regulating member 20 is in the angular position A3, the slot 21 itself establishes the minimum flow rate $Q_{min}$ of NG through the valve 100 without the need of there being a first calibrated opening 32 in the injector 30 for establishing the minimum gas flow $Q_{min}$. In such implementations, the first calibrated opening 32 in the injector 30 is substituted with any sized passage sufficient for delivering the minimum flow of NG. In such an implementation where the slot 21 itself is calibrated to establish a minimum gas flow $Q_{min}$ of NG, the regulating valve 100 with the same regulating member 20 may be used to regulate the flow of LPG by a use of the second type of injector 30 configured for the delivery of LPG positioned in the outlet conduit 12 of the valve 100. In such an instance, the first calibrated hole 32 of the second type of injector for LPG provides a further restriction to gas flow to establish the minimum gas flow $Q_{min}$ for LPG.

In a like manner, according to some implementations the first opening 22 of the regulating member 20 is calibrated to establish a maximum gas flow $Q_{max}$ of NG. That is, the dimensional characteristics the first opening 22 are such that when the regulating member 20 is in the angular position A1, the first opening itself establishes the maximum flow rate $Q_{max}$ of NG through the valve 100 without the need of there being a second calibrated opening 33 in the injector 30 for establishing the maximum gas flow $Q_{max}$. In such implementations, the second calibrated opening 33 in the injector 30 may be omitted or substituted with any sized passage sufficient for delivering the maximum flow of NG. In such an implementation where the first opening 22 itself is calibrated to establish a maximum gas flow $Q_{max}$ of NG, the regulating valve 100 with the same regulating member 20 may be used to regulate the flow of LPG by a use of the second type of injector 30 configured for the delivery of LPG positioned in the outlet conduit 12 of the valve 100. In such an instance, the second calibrated hole 33 of the second type of injector for LPG provides a further restriction to gas flow to establish the maximum gas flow $Q_{max}$ for LPG.

Figure 7B:
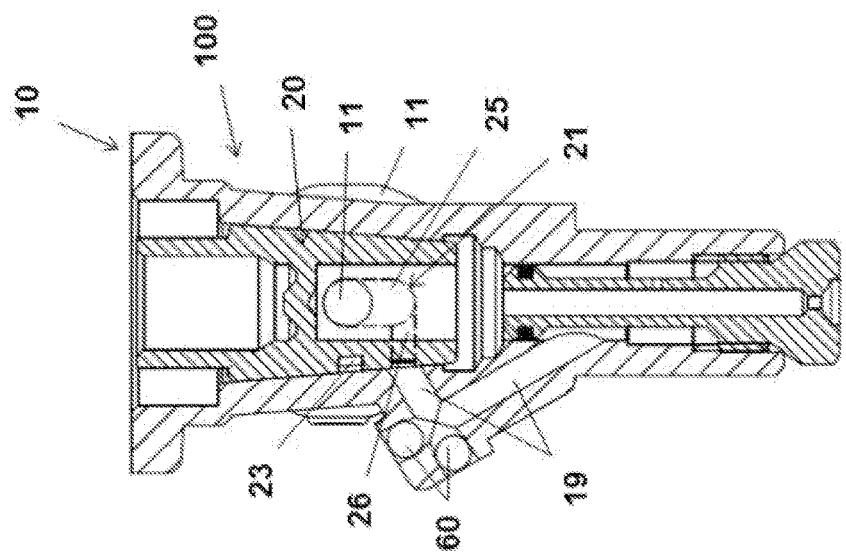
FIG. 7b shows a longitudinal section view of the regulating valve of FIG. 7a, the regulating member being regulated in the angular position corresponding to minimum flow.
Figure 7A:
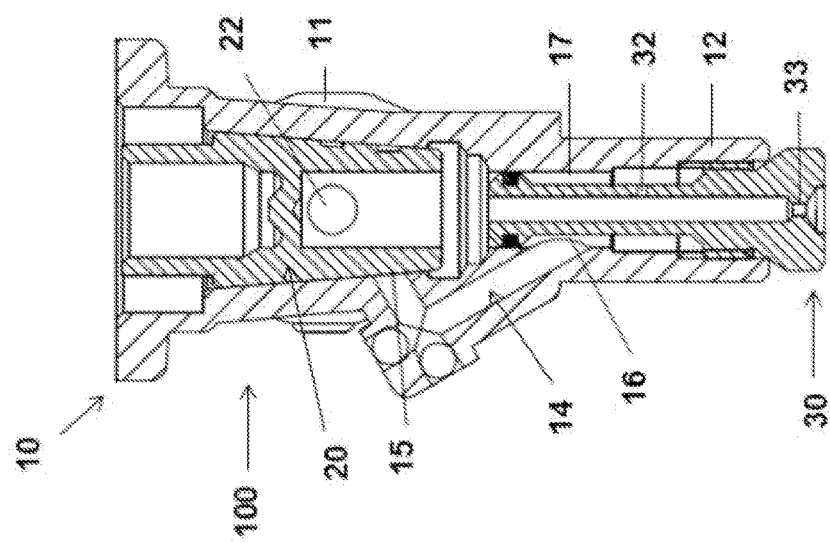
FIG. 7a shows a longitudinal section view of a regulating valve according to another implementation, the regulating member being regulated in the angular position corresponding to a maximum flow.
Figures 8A, 8B:
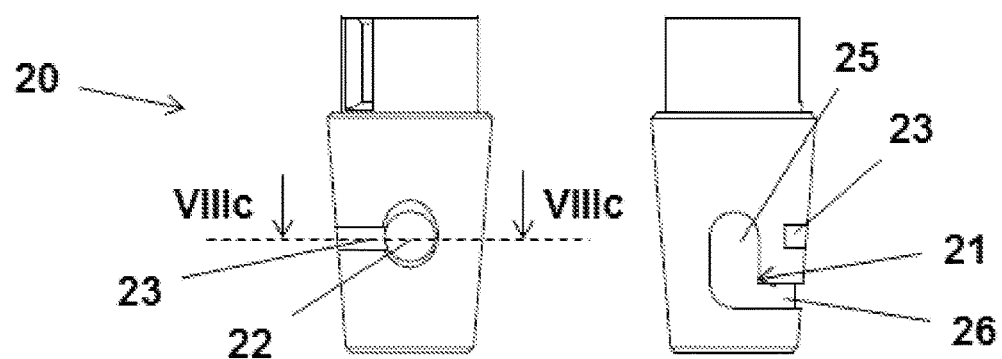
FIG. 8a shows an elevation view of the regulating member of the regulating valve of FIG. 7a, showing the first opening corresponding to a maximum flow and the second groove-shaped opening corresponding to an intermediate flow.
FIG. 8b shows an elevation view of the regulating member of FIG. 8a, showing the slot corresponding to a minimum flow.
Figure 8C:
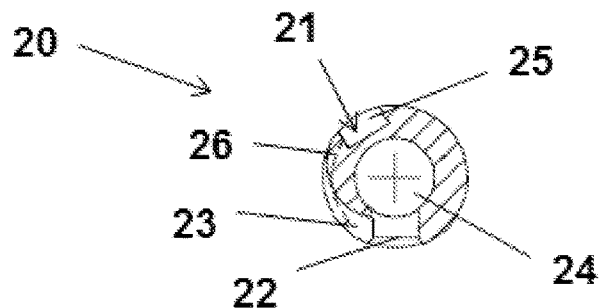
FIG. 8c shows a section view of the regulating member of FIG. 8a according to line VIIIc-VIIIc.

FIG. 7a shows a longitudinal section view of a regulating valve 100 according to another implementation wherein the regulating member 20 is in the angular position A1 corresponding to maximum flow $Q_{Max}$. FIG. 7b shows a longitudinal section view of the same regulating valve 100 depicted FIG. 7a with the regulating member 20 being in the angular position A3 corresponding to minimum flow $Q_{Min}$. An elevation view of the regulating member 20 is also shown in FIG. 8a, the first opening 22 corresponding to maximum flow $Q_{Max}$, and the second groove-shaped opening 23 corresponding to intermediate flow $Q_{int}$. An elevation view of the regulating member 20 is also shown in FIG. 8b, the slot 21 corresponding to minimum flow $Q_{Min}$, FIG. 8c shows a section view of the regulating member 20 according to line VIIIc-VIIIc. According to the implementations of FIGS. 7 and 8, the longitudinal axis of the groove 26 of the slot 21 of the regulating member 20 is arranged axially below the position of the longitudinal axis of the second opening 23.

Figures 9A, 9B:
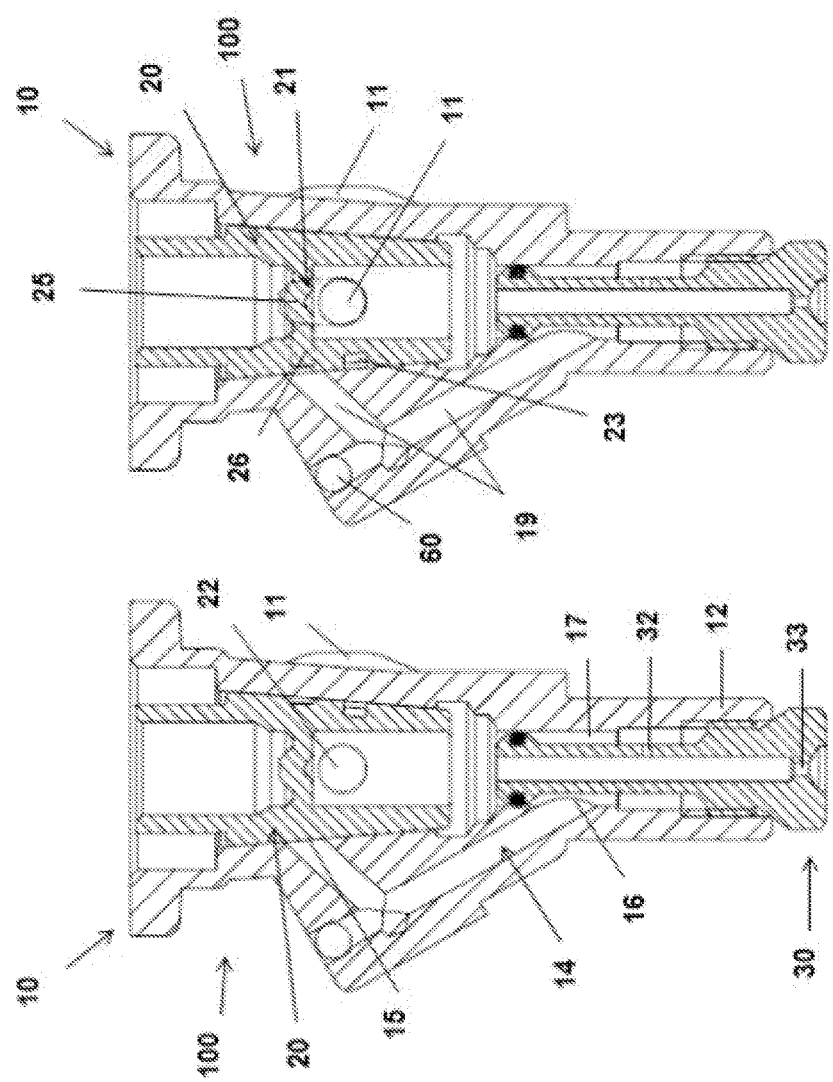
FIG. 9a shows a longitudinal section view of a regulating valve according to another implementation, the regulating member being regulated in the angular position corresponding to a maximum flow.
FIG. 9b shows a longitudinal section view of the regulating valve of FIG. 9a, the regulating member being regulated in the angular position corresponding to a minimum flow.
Figures 10A, 10B:
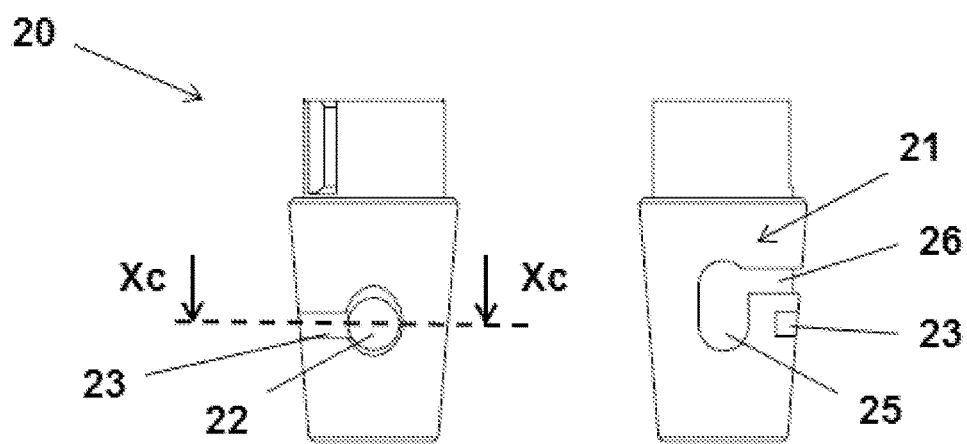
FIG. 10a shows an elevation view of the regulating member of the regulating valve of FIG. 9a, showing the first opening corresponding to a maximum flow and the second groove-shaped opening corresponding to an intermediate flow.
FIG. 10b shows an elevation view of the regulating member of FIG. 10a, showing the slot corresponding to a minimum flow.
Figure 10C:
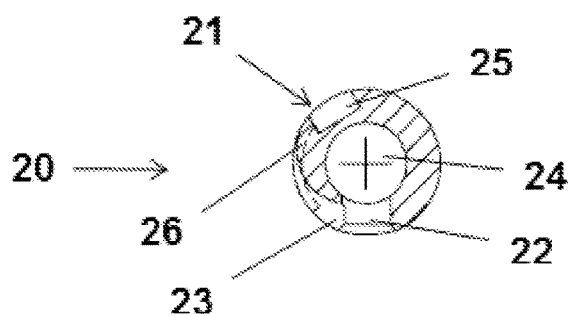
FIG. 10c shows a section view of the regulating member of FIG. 10a according to line Xc-Xc.

FIG. 9a shows a longitudinal section view of a regulating valve 100 according to another implementation with the regulating member 20 being regulated in angular position A1 corresponding to maximum flow $Q_{Max}$. FIG. 9b shows a longitudinal section view of the same regulating valve 100 depicted in FIG. 9a with the regulating member 20 being regulated in angular position A3 corresponding to minimum flow $Q_{Min}$. An elevation view of the regulating member 20 of the regulating valve 100 is shown in FIG. 10a showing the first opening 22 corresponding to maximum flow $Q_{Max}$ and the second groove-shaped opening 23 corresponding to intermediate flow $Q_{int}$. An elevation view of the regulating member 20 is also shown in FIG. 10b showing the slot 21 corresponding to minimum flow $Q_{Min}$. FIG. 10c shows a section view of the regulating member 20 according to line Xc-Xc. According to the implementations of FIGS. 9 and 10, the longitudinal axis of the groove 26 of the slot 21 of the regulating member 20 is arranged axially above the position of the longitudinal axis of the second opening 23.

The valve body 100 may be made of any of a variety of materials, and in a preferred implementation comprises a metal. According to some implementations the valve body 10 is machined in order to produce the inner conduit 14 that connects the slot 21 with the outlet conduit 12. According to some implementations a drill is used to produce the multiple sub-conduits 19 that form the inner conduit 14.

According to some implementations the inner conduit 14 of the valve body 10 is formed by two or three sub-conduits 19 as shown in FIGS. 3, 7 and 9, with at least one of the sub-conduits 19 opening from outside the valve body 10. According to some implementations, as shown in FIG. 9, at least one other sub-conduit 19 opens from inside the valve body 10. Upon the sub-conduits 19 being formed, access to the sub-conduits 19 from outside the valve body 10 are closed. According to some implementations closure of the sub-conduits 19 is provided by metal balls 60 as depicted in FIGS. 3, 7 and 9. Closure of the sub-conduits 19 to the outside of the valve 100 may be accomplished by any of a variety of other suitable sealing means.

In the regulating valve 100 shown in FIGS. 3a and 3b, the inner conduit 14 of the valve body 10 is formed by three sub-conduits 19, the three sub-conduits 19 being open from outside the valve body 10, and each of the sub-conduits 19 being closed from the outside with a metal ball 60.

In the regulating valve 100 shown in FIGS. 7a and 7b, the inner conduit 14 of the valve body 10 is formed by two sub-conduits 19, the two sub-conduits 19 being open from outside the valve body 10, and each of the sub-conduits 19 being closed from the outside with a metal ball 60.

In the regulating valve 100 shown in FIGS. 9a and 9b, the inner conduit 14 of the valve body 10 is formed by two sub-conduits 19, one of the sub-conduits 19 being open from outside the valve body 10, and the other sub-conduit 19 being open from inside the valve body 10. The sub-conduit 19 open from outside the valve body 10 is closed by means of a ball 60, and the other sub-conduit 19, open from inside the valve body 10, is not closed as it coincides with a first section of the inner conduit 14 between the first opening 15 of the inner conduit 14, and the connection with the sub-conduit 19 open from outside the valve body 10. The sub-conduit 19 opening from outside the valve body 10 coincides with a second section of the inner conduit 14, between the connection with the first section of the inner conduit 14 and the second opening 16 of the inner conduit 14.

What is claimed is:

1. A regulating valve for regulating the flow of a first type of gas or a second type of gas, the regulating valve comprising:

a valve body including a gas inlet conduit, a gas outlet conduit and an inner conduit, each of the gas inlet conduit, gas outlet conduit and inner conduit being in fluid communication with a cavity located in the valve body, the inner conduit extending between the cavity and the gas outlet conduit, the inner conduit having an inlet opening that opens into the cavity and an outlet opening that opens into the gas outlet conduit; and a regulating member having a longitudinal axis that is housed and rotatable in the cavity of the valve body, the regulating member including a wall that separates an exterior of the regulating member with a longitudinal inner chamber of the regulating member, the longitudinal inner chamber having an outlet in fluid communication with the gas outlet conduit of the valve body, the regulating member having a first opening corresponding to a maximum gas flow of each of the first and second types of gases that extends from the exterior of the regulating member into the longitudinal inner chamber, a second opening corresponding to an intermediate gas flow of each of the first and second types of gases that extends from the exterior of the regulating member into the longitudinal inner chamber, and a slot corresponding to a minimum gas flow of the first and second types of gas formed in the wall and extending only partially through the wall, the regulating member rotatable between at least first, second and third angular positions, in the first angular position the first opening corresponding to the maximum gas flow is aligned with the inlet conduit of the valve body, in the second angular position the second opening corresponding to the intermediate gas flow is aligned with the inlet conduit of the valve body, in the third angular position the slot is aligned with the inlet conduit of the valve body and also with the inlet opening of the inner conduit, wherein gas flow is prevented from passing between the slot and the inner conduit when the second opening of the regulating member is in fluid communication with the inlet conduit of the valve body.

2. A regulating valve according to claim 1, wherein the first type of gas is natural gas and the second types of gas is liquefied gas.

3. A regulating valve according to claim 1, wherein at least a portion of each of the first opening, the second opening and the slot occupy a same longitudinal position on the regulating member.

4. A regulating valve according to claim 1, wherein the second opening in the regulating member comprises a first elongate groove that partially circumscribes the regulating member.

5. A regulating valve according to claim 4, wherein an end of the first elongate groove opens into the first opening.

6. A regulating valve according to claim 5, wherein the slot comprises a second elongate groove that partially circumscribes the regulating member, the first and second elongate grooves being spaced longitudinally apart on the regulating member.

7. A regulating valve according to claim 1, wherein the slot comprises a substantially circular cavity in fluid communication with an elongate groove that partially circumscribes the regulating member, when the regulating member is in the third angular position the substantially circular cavity is aligned with the inlet conduit of the valve body and at least a portion of the elongate groove is aligned with the inlet opening of the inner conduit.

8. A regulating valve according to claim 2, wherein the first type of gas is natural gas and the second type of gas is liquified gas, the regulating valve further comprising a removable injector arranged in the gas outlet conduit of the valve body, the injector having a first end and a second end and comprising an inner passage running axially between a first opening in the first end and a second opening in the second end, the injector having a central body with an outer surface, the outer surface of the central body and an inner surface of the gas outlet conduit of the valve body defining an intermediate chamber into which the outlet opening of the inner conduit of the valve body opens, the inner passage of the injector being in fluid communication with the longitudinal inner cavity of the regulating member, the intermediate chamber being insulated from the longitudinal inner cavity of the regulating member by a seal located at or near the first end of the injector, the central body of the injector having a first calibrated opening extending between the outer surface of the central body and the inner passage, the first calibrated opening configured to establish a minimum gas flow through the regulating valve for the first type of gas.

9. A regulating valve according to claim 8, further comprising a second calibrated opening located within the inner passage of the injector, the second calibrated opening disposed nearer the second end of the injector than the first calibrated opening, the second calibrated opening configured to establish a maximum gas flow through the regulating valve for the first type of gas.

10. A regulating valve according to claim 8, wherein the removable injector comprises a threaded area at or near the second end that attaches to the gas outlet conduit of the valve body via a threaded engagement, the threaded engagement insulating the intermediate chamber from an exterior of the regulating valve.

11. A regulating valve according to claim 8, wherein the first end of the removable injector comprises a circular groove with a gasket disposed therein, the gasket forming a seal between the injector and the outer surface of the gas outlet conduit of the valve body.

12. A regulating valve according to claim 8, wherein the first calibrated opening is located near the second end of the removable injector.

13. A regulating valve according to claim 10, wherein the first calibrated opening is located near the threaded area of the removable injector.

14. A regulating valve according to claim 8, wherein the valve body comprising an outlet chamber communicating the outlet of the longitudinal inner chamber of the regulating member with the inner passage of the removable injector.

15. A regulating valve according to claim 1, wherein the first opening, second opening and slot correspond with different angular positions of the regulating member.

16. A regulating valve according to claim 3, wherein the first opening, second opening and slot correspond with different angular positions of the regulating member.

17. A regulating valve according to claim 1, wherein the second opening comprises a groove that runs substantially perpendicular to the longitudinal axis of the regulating member, the groove having a first end and a second end, the first end of the second opening being communicated with the first opening, the groove having a decreasing width between the first end and the second end.

18. A regulating valve according to claim 17, wherein the longitudinal axis of the groove is substantially aligned with the center of the first opening.

19. A regulating valve according to claim 6, wherein the first elongate groove resides nearer the outlet of the regulating member than the second elongate groove.

20. A regulating valve according to claim 6, wherein the second elongate groove resides nearer the outlet of the regulating member than the first elongate groove.

21. A regulating valve according to claim 1, wherein the valve body is made of a metal material, the inner conduit of the valve body comprising a plurality of sub-conduits, at least one of the plurality of sub-conduits being sealed from an exterior of the valve body by means of a metal ball.

22. A regulating valve according to claim 2 wherein the first type of gas is natural gas and the second type of gas is liquefied gas, the regulating valve further comprising a removable injector arranged in the gas outlet conduit of the valve body, the injector having a first end and a second end and comprising an inner passage running axially between a first opening in the first end and a second opening in the second end, the injector having a central body with an outer surface, the outer surface of the central body and an inner surface of the gas outlet conduit of the valve body defining an intermediate chamber into which the outlet opening of the inner conduit of the valve body opens, the inner passage of the injector being in fluid communication with the longitudinal inner cavity of the regulating member, the intermediate chamber being insulated from the longitudinal inner cavity of the regulating member by a seal located at or near the first end of the injector, the central body of the injector having a first calibrated opening extending between the outer surface of the central body and the inner passage, the first calibrated opening configured to establish a minimum gas flow through the regulating valve for the second type of gas.

23. A regulating valve according to claim 22, further comprising a second calibrated opening located within the inner passage of the injector, the second calibrated opening disposed nearer the second end of the injector than the first calibrated opening, the second calibrated opening configured to establish a maximum gas flow through the regulating valve for the second type of gas.

24. A regulating valve according to claim 22, wherein the removable injector comprises a threaded area at or near the second end that attaches to the gas outlet conduit of the valve body via a threaded engagement, the threaded engagement insulating the intermediate chamber from an exterior of the regulating valve.

25. A regulating valve according to claim 22, wherein the first end of the removable injector comprises a circular groove with a gasket disposed therein, the gasket forming a seal between the injector and the outer surface of the gas outlet conduit of the valve body.

26. A regulating valve according to claim 22, wherein the first calibrated opening is located near the second end of the removable injector.

27. A regulating valve according to claim 24, wherein the first calibrated opening is located near the threaded area of the removable injector.

28. A regulating valve according to claim 22, wherein the valve body comprising an outlet chamber communicating the outlet of the longitudinal inner chamber of the regulating member with the inner passage of the removable injector.

* * * * *